US009567006B2

(12) United States Patent
Fu

(10) Patent No.: US 9,567,006 B2
(45) Date of Patent: Feb. 14, 2017

(54) METHOD AND CONTROL DEVICE FOR SITUATION-RELATED STEERING ASSISTANCE IN A LANE KEEPING ASSISTANT FOR A VEHICLE

(71) Applicant: Robert Bosch GmbH, Stuttgart (DE)

(72) Inventor: Chengxuan Fu, Kirchheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 14/553,661

(22) Filed: Nov. 25, 2014

(65) Prior Publication Data
US 2015/0149039 A1 May 28, 2015

(30) Foreign Application Priority Data
Nov. 27, 2013 (DE) .......... 10 2013 224 303

(51) Int. Cl.
B62D 15/02 (2006.01)
(52) U.S. Cl.
CPC .................. B62D 15/025 (2013.01)
(58) Field of Classification Search
CPC ....................................... G05D 1/00
USPC ............................................. 701/41
See application file for complete search history.

(56) References Cited

U.S. PATENT DOCUMENTS

| 6,370,471 B1 | 4/2002 | Lohner et al. | |
| 7,418,372 B2* | 8/2008 | Nishira | B60K 31/0008 700/44 |
| 8,032,235 B2* | 10/2011 | Sayyar-Rodsari | G05B 13/048 700/258 |
| 8,311,729 B2* | 11/2012 | Saito | G08G 1/165 701/117 |
| 8,421,648 B2* | 4/2013 | Konaka | B62D 15/029 340/438 |
| 8,437,890 B2* | 5/2013 | Anderson | B60W 30/09 701/23 |
| 8,543,261 B2* | 9/2013 | Anderson | B60W 30/09 701/3 |
| 8,688,327 B2* | 4/2014 | Limpibunterng | B62D 1/286 180/404 |
| 8,818,606 B2* | 8/2014 | Lee | B60W 10/20 701/23 |
| 8,914,181 B2* | 12/2014 | Essame | B60W 30/18163 701/23 |
| 8,965,617 B2* | 2/2015 | Takahara | G01C 21/3697 701/22 |
| 2012/0123643 A1* | 5/2012 | Limpibuntering | B62D 1/286 701/42 |

FOREIGN PATENT DOCUMENTS

| EP | 0 640 903 | 3/1995 |
| WO | WO 2011/016429 | 2/2011 |

* cited by examiner

Primary Examiner — Thomas Tarcza
Assistant Examiner — Alex C Dunn
(74) Attorney, Agent, or Firm — Norton Rose Fulbright US LLP

(57) ABSTRACT

A method for situation-related steering assistance in a lane keeping assistant for a vehicle includes: importing a collision signal; ascertaining a correction signal for adapting an intervention torque for the lane keeping assistant, in order to provide a situation-related steering assistance in the lane keeping assistant. The collision signal represents information about a risk of collision during a lane change, and the correction signal is ascertained using the collision signal.

10 Claims, 2 Drawing Sheets

METHOD AND CONTROL DEVICE FOR SITUATION-RELATED STEERING ASSISTANCE IN A LANE KEEPING ASSISTANT FOR A VEHICLE

BACKGROUND OF THE INVENTION

1. Field of the Invention

The present invention relates to a method for situation-related steering assistance in a lane keeping assistant for a vehicle, to a corresponding control device for situation-related steering assistance in a lane keeping assistant for a vehicle, and to a corresponding computer program product.

2. Description of the Related Art

In a lane keeping assistant ("Lane Keeping Support" or LKS), a front camera records the lane markings and calculates the lateral position of the particular vehicle (ego-vehicle). The lane keeping assistant attempts to keep the particular vehicle in the lane or to prevent an unintended lane departure, in which corrective or assisting steering interventions or braking interventions are requested via a power steering ("Electric Power Steering" or EPS) or an electronic stability control ("Electronic Stability Control" or ESP). The interventions of the lane keeping assistant, such as a change of steering torque, may be overridden by the driver of a vehicle. In the event the driver steers counter to the intervention torque of the lane keeping assistant (the driver hand torque is continuously monitored by a torque sensor on the steering wheel), this is evaluated as a desired intention to change lanes, as a result of which the lane keeping assistant switches off. If the driver hand torque drops below a certain threshold, the lane keeping assistant attempts to reactivate itself. If the driver activates the direction indicator, the intervention torque of the lane keeping assistant is then also deactivated.

The published European patent application document EP 0640 903 A1 describes a driver assistance system for a vehicle, which assists a driver in staying in a lane.

BRIEF SUMMARY OF THE INVENTION

Against this background, a method is provided, based on the approach introduced herein, for situation-related steering assistance in a lane keeping assistant for a vehicle, further a control device for situation-related steering assistance in a lane keeping assistant for a vehicle which uses this method, and finally, a corresponding computer program product.

A lane keeping assistant may be switched off by the driver of a vehicle using predetermined actions. Alternatively, the driver may steer the vehicle out of a lane against the recommendation of a lane keeping assistant, for example, in order to initiate a passing maneuver. The vehicle may have sensors or communication devices designed to provide a collision signal, which may affect the behavior of the lane keeping assistant. A collision signal in such a case may represent a risk of collision for the vehicle.

A method for situation-related steering assistance in a lane keeping assistant for a vehicle is provided, the method including the following steps:
importing a collision signal, the collision signal representing a piece of information about a risk of collision during a lane change; and
ascertaining a correction signal for adapting an intervention torque for the lane keeping assistant, the correction signal being ascertained using the collision signal, in order to provide a situation-related steering assistance in a lane keeping assistant.

A lane keeping assistant is also referred to by the English terms "lane keeping support," abbreviated to LKS, or as "heading control." A vehicle may include a lane keeping assistant. A situation-related steering assistant advantageously increases driving safety for the vehicle or for the driver of the vehicle by way of information merging or data merging. In this arrangement, information from various systems may be combined. Advantageously, the functionality of the lane keeping assistant is linked to the information of collision protection. A steering assistance in such a case may be understood to mean a signal representing a driver oversteer or a steering moment or a driver oversteer, an intervention moment or a steering moment. The signal of the steering assistance may affect or control an intervention torque of the lane keeping assistant.

The method may include a step of evaluating an ambient signal, in order to determine a risk of collision and, additionally or alternatively, a lane marking feature, and to provide a corresponding collision signal. An ambient signal may be understood to mean a signal which represents a piece of information about lane markings, lane margins, potential collision objects in the lane or in a potential or neighboring lane. Advantageously, the method for situation-related steering assistance in a lane keeping assistant may therefore independently detect a risk of collision. The method may advantageously provide a signal in order to affect an intervention torque of the lane keeping assistant.

Also in the method, in the step of importing, a collision signal may be imported, which represents a time-to-collision of the vehicle with an object and, additionally or alternatively, another vehicle in an adjacent lane. The time-to-collision may be understood to mean a time span or time interval, a collision of the vehicle with the other vehicle or the object being imminent at the end of the time interval, if no change in the driving direction or speed of the vehicle or no intervention in the steering of the vehicle is carried out. The object or the other vehicle in such a case may move absolutely or relative to the vehicle.

Also in the method, in the step of importing, a collision signal may be imported, which represents a risk of collision with a stationary object and, additionally or alternatively, a stationary vehicle. A stationary object or vehicle may be understood to mean a non-moving object relative to the surroundings or another vehicle. The stationary object or vehicle may be situated in the lane or in the potential lane of the vehicle. The collision signal may be provided by forward-looking sensors or a camera or a control device connected to the forward-looking sensors or camera.

Also in the method, in the step of importing, a collision signal may be imported, which represents a risk of collision by another overtaking vehicle. Thus, the risk of collision or a lane change may be disregarded. If the overtaking vehicle has a higher speed than the vehicle or ego-vehicle or, when viewed in the driving direction, is situated next to the vehicle, a collision may be imminent as a result of a lane change, which is represented by the collision signal. Thus, the area monitored may also be expanded to an area next to or behind the vehicle.

It is also beneficial if in the step of ascertaining, the correction signal is ascertained using a piece of information about a driving situation and, in addition or alternatively, a lane marking. A driving situation or a lane marking may be understood to mean a dashed line, a solid-line or double solid-line lane markings.

In the step of ascertaining, the correction signal may be ascertained using a direction indicator signal, the direction indicator signal representing a piece of information about a lane change initiated and desired by the driver of the vehicle. The direction indicator signal may represent an intention to change lanes.

A control device is provided for situation-related steering assistance in a lane keeping assistant for a vehicle, the control device including the following features:
an interface for importing a collision signal, the collision signal representing a piece of information about a risk of collision during a lane change; and
a device for ascertaining a correction signal for adapting an intervention torque for the lane keeping assistant, the correction signal being ascertained using the collision signal, in order to provide situation-related steering assistance in a lane keeping assistant.

The approach introduced herein provides a control device for situation-related steering assistance in a lane keeping assistant for a vehicle, the control device being designed to carry out or implement the steps of a variant of a method introduced herein in corresponding devices. With this embodiment variant of the present invention in the form of a control device as well, the object of the present invention may be quickly and efficiently achieved.

A control device in the present case may be understood to mean an electrical device which processes sensor signals and, as a function thereof, emits control signals and/or data signals. The control device may include an interface which may be designed on the hardware side and/or the software side. In a design on the hardware side, the interfaces may, for example, be part of a so-called ASIC system which contains a wide variety of functions of the control device. However, it is also possible that the interfaces are individual, integrated circuits or are made up at least partly of discrete components. In a design on the software side, the interfaces may be software modules which, for example, are present on a microcontroller next to other software modules.

It is also beneficial if the interface for importing the collision signal is designed to receive a collision signal provided by a sensor and/or a camera and, in addition or alternatively, to import it. The sensor or the camera in this case may be a mono front camera and, in addition or alternatively, a stereo front camera and, in addition or alternatively, an ultrasound sensor and, in addition or alternatively, a radar sensor and, in addition or alternatively, forward-looking sensors and, in addition or alternatively, a distance sensor. The collision signal may be provided as an analog and/or digital collision signal and may be read by the importing interface.

Another advantage is a computer program product having program code which may be stored on a machine-readable medium, such as a semiconductor memory, a hard disk memory or an optical memory, and is used to carry out the method according to one of the specific embodiments described above, when the program product is executed on a computer or a device.

The approach introduced herein is explained in greater detail below with reference to the appended drawings.

DETAILED DESCRIPTION OF THE INVENTION

Figure 1:
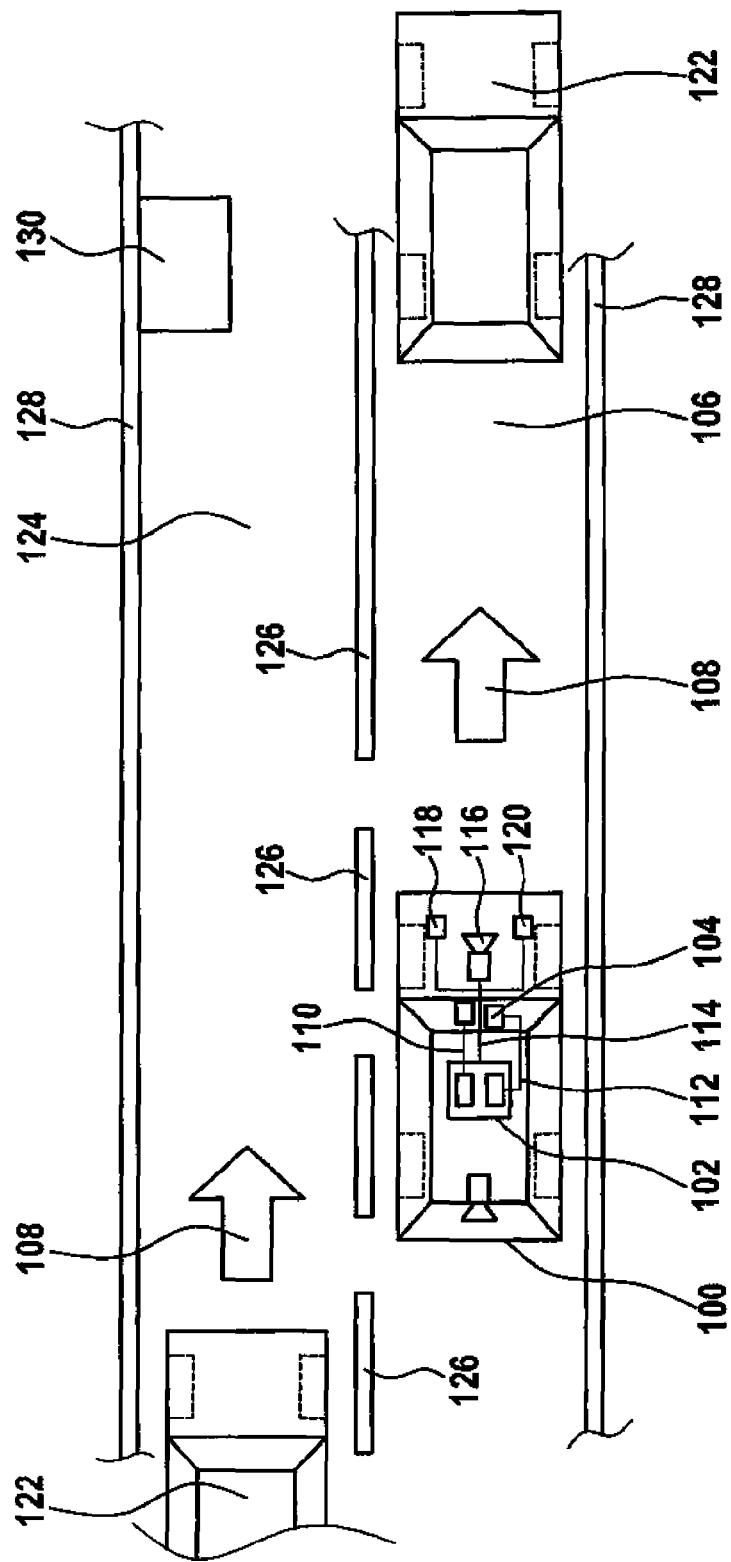
FIG. 1 schematically shows a representation of a vehicle having a control device for situation-related steering assistance in a lane keeping assistant according to one exemplary embodiment of the present invention.

In the following description of preferred exemplary embodiments of the present invention, identical or similar reference numerals are used for elements which are similar operating elements and represented in the various figures, a repeated description of these elements being omitted.

FIG. 1 schematically shows a representation of a vehicle 100 having a control device 102 for situation-related steering assistance in a lane keeping assistant 104 according to one exemplary embodiment of the present invention. Vehicle 100 is situated in a lane 106 in a driving direction 108 indicated by an arrow. Control device 102 is designed to input a collision signal 110 and to provide a correction signal 112.

In one exemplary embodiment, control device 102 is designed to input and evaluate an ambient signal 114. In this case, control device 102 may be designed to ascertain collision signal 110 in response to ambient signal 114. Ambient signal 114 is provided by a mono front camera 116, an ultrasound sensor 118 or forward-looking sensors 120. In one exemplary embodiment which is not shown, ambient signal 114 is provided by a stereo front camera, a distance sensor or a radar sensor.

In another exemplary embodiment, collision signal 110 is determined from ambient signal 114 in a control device which is not shown. Ambient signal 114, depending on the exemplary embodiment, is an analog or a digital signal. Ambient signal 114 may also be determined by a combination of signals of a plurality of sensors 118, 120 or cameras 116.

Another vehicle 122 is located in lane 106 in driving direction 108 in front of vehicle 100. Situated in driving direction 108 to the left of lane 106 is an adjacent lane 124. Adjacent lane 124 is separated from lane 106 by a lane marking 126. On the side facing away from lane marking 126 which separates both lanes 106, 124, lanes 106, 124 include an additional lane marking 128. Lane marking 126, 128 is variously marked depending on the road situation. For example, side delimiting lane marking 128 is marked as a solid line. Lane marking 126 separating both lanes 106, 124 is formed in one section as a dashed line and in another section as a solid line.

Another vehicle 122 and an object 130 are situated in adjacent lane 124. In the exemplary embodiment depicted, another vehicle 122 in adjacent lane 124 is situated in driving direction 108 of vehicle 100 diagonally behind the latter. Object 130 is situated in driving direction 108 of vehicle 100 diagonally in front of the latter.

One aspect of the present invention is a consideration of information about the surroundings in a steering assistance or driver override (driver override) of the lane keeping assistant in vehicle 100. Thus, in order to increase driving safety, the torque threshold for the switching off or the switching off strategy of the lane keeping assistant (LKS) is varied as a function of the instantaneous surrounding conditions and situational conditions. Increased driving safety is advantageously achieved by the merging and utilization of information.

In the event a risk of collision with other objects 122, 130 exists if the vehicle 100 were to follow the trajectory desired by the driver, then the lane keeping assistant—assistance torque (LKS-assistance torque) is not switched off, or is switched off only in the case of a very extreme counter-torque by the driver. In that case, a directional indicator (direction indicator signal), which would otherwise automatically deactivate the lane keeping assistant, may even be ignored. Because of the altered reaction of the lane keeping assistant—overriding becomes more difficult—the driver is made aware of the imminent danger, so that the driver is able, if necessary, to cancel the initiated lane change maneuver in a timely manner. Since the lane keeping assistant torque is subject to a maximum limitation, the driver may still continue to override the lane keeping assistant torque at any time. Other objects 122, 130 are moving or standing objects such as, for example, other vehicles 122, concrete walls 130, trees 130, etc.

Depending on the exemplary embodiment, different risks of collision, a combination of different risks of collision, or all of the following risks of collision are detected. With the aid of various sensors, for example, a mono front camera 116, it is possible to estimate the distance or the time-to-collision (TTC: time to collision) relative to vehicles 122 in front, or to other objects 130 in neighboring lanes 124, i.e., adjacent lanes 124. With the aid of various sensors, for example, stereo front cameras 116, it is possible to detect whether stationary obstacles 130 such as, for example, concrete walls, parked vehicles, exist next to current lane 106 (ego lane). With the aid of various sensors, for example, ultrasound sensors 118 or radar sensors, it is possible to detect overtaking vehicles 122.

If no risk of collision exists on the desired trajectory, the lane keeping assistant switch-off torque, or the required driver counter-torque for the lane keeping assistant switch-off, is then varied depending on the lane marking characteristics. If the driver wishes to cross a dashed lane marking without activating the direction indicator, then the required driver counter-torque is relatively minimal. If, however, the driver wishes to cross a solid lane marking without activating the direction indicator, the required driver counter-torque is then relatively great or high. If the driver activates the direction indicator, the lane keeping assistant torque is deactivated. Deactivation may occur by allowing only one movement of the vehicle in the indicated driving direction 108, and steering by the driver in the opposite direction is nevertheless counteracted by the lane keeping assistant.

Figure 2:
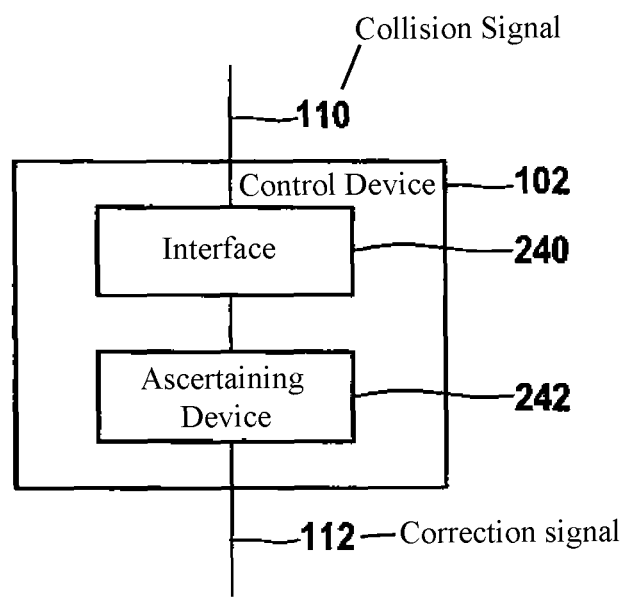
FIG. 2 shows a block diagram of a control device for situation-related steering assistance in a lane keeping assistant for a vehicle according to one exemplary embodiment of the present invention.

FIG. 2 shows a block diagram of a control device 102 for situation-related steering assistance in a lane keeping assistant for a vehicle 100 according to one exemplary embodiment of the present invention. Control device 102 and vehicle 100 may be a variant of control device 102 and vehicle 100 shown and described in FIG. 1. Control device 102 includes an interface 240 for importing a collision signal 110, as well as a device 242 for ascertaining a correction signal 112 for adapting an intervention torque for the lane keeping assistant. Collision signal 110 represents a piece of information about a risk of collision during a lane change. Correction signal 112 is ascertained using collision signal 110, in order to provide a situation-related steering assistance in a lane keeping assistance.

In one exemplary embodiment, interface 240 for importing the collision signal 110 is designed for receiving and importing an analog or digital collision signal provided by a mono front camera, forward-looking sensors or a distance sensor.

Figure 3:
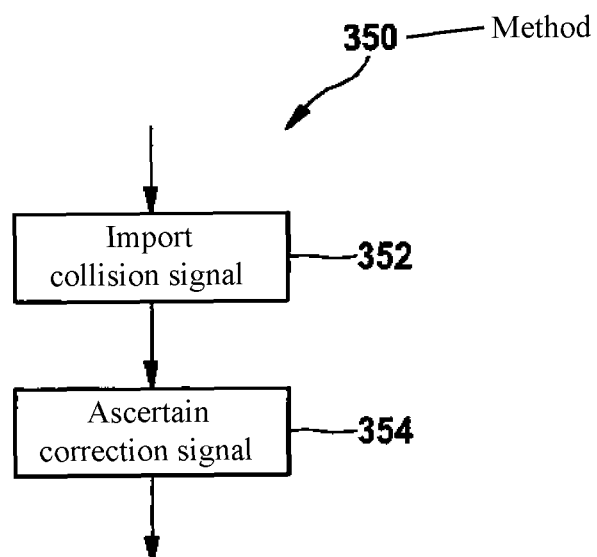
FIG. 3 shows a flow chart of a method for situation-related steering assistance in a lane keeping assistant for a vehicle according to one exemplary embodiment of the present invention.

FIG. 3 shows a flow chart of a method 350 for situation-related steering assistance in a lane keeping assistant for a vehicle according to one exemplary embodiment of the present invention. Method 350 for situation-related steering assistance in a lane keeping assistant for a vehicle includes steps such as step 352 of importing a collision signal, as well as step 354 of ascertaining a correction signal for adapting an intervention torque for the lane keeping assistant. The collision signal represents a piece of information about a risk of collision during a lane change. The correction signal is ascertained using the collision signal, in order to provide a situation-related steering assistance in a lane keeping assistant.

In one exemplary embodiment, method 350 includes an optional step of evaluating an ambient signal in order to determine a risk of collision or a lane marking characteristic, as well as a corresponding collision signal. The step of evaluating is advantageously carried out prior to step 352 of importing.

The collision signal in one exemplary embodiment represents a time-to-collision of the vehicle or a risk of collision with an object or with another vehicle in an adjacent lane. Depending on the exemplary embodiment, the object is moved or is stationary. If the object or the other vehicle moves, it may move in the driving direction of the vehicle as well as opposite or transverse to the driving direction of the vehicle. Thus, the risk of collision in one exemplary embodiment represents a risk of colliding with another overtaking vehicle.

In the step of ascertaining, the correction signal in one exemplary embodiment is ascertained using a piece of information about a driving situation or a lane marking. Alternatively or in addition, the correction signal is ascertained using a direction indicator signal, the direction indicator signal representing a piece of information about a lane change initiated and desired by the driver of the vehicle.

The exemplary embodiments described and shown in the figures are chosen merely by way of example. Different exemplary embodiments may be combined with one another fully or with respect to individual features. An exemplary embodiment may also be supplemented by features of another exemplary embodiment.

In addition, the method steps introduced herein may be repeated and carried out in a sequence other than that described.

If an exemplary embodiment includes an "and/or" link between a first feature and a second feature, this is to be read in the sense that the exemplary embodiment according to one specific embodiment includes both the first feature as well as the second feature, and according to another specific embodiment, either just the first feature or just the second feature.

What is claimed is:

1. A method for situation-related steering assistance in a lane keeping assistant for a vehicle, comprising:
   importing, with an interface, during a lane change, a collision signal representing an item of information about a risk of collision;
   ascertaining, with a processor, a correction signal for an intervention steering torque of the lane keeping assistant using the collision signal; and
   adapting, with the processor, the intervention steering torque of the lane keeping assistant based on the correction signal, wherein (i) the intervention steering torque counteracts a steering torque applied by a driver of the vehicle and (ii) a steering torque threshold for deactivating the intervention steering torque varies as a function of the vehicle's surrounding conditions, wherein the intervention steering torque is deactivated if the steering torque applied by the driver exceeds the steering torque threshold.

2. The method as recited in claim 1, further comprising: evaluating an ambient signal, in order to determine at least one of a risk of collision and a lane marking feature, and to provide the corresponding collision signal.

3. The method as recited in claim 2, wherein the collision represents a time-to-collision of the vehicle with at least one of an object and another vehicle in an adjacent lane.

4. The method as recited in claim 2, wherein the collision signal represents a risk of collision with at least one of a stationary object and a stationary vehicle.

5. The method as recited in claim 2, wherein the collision signal represents a risk of collision by an overtaking vehicle.

6. The method as recited in claim 2, wherein the correction signal is ascertained using an item of information about at least one of a driving situation and a lane marking.

7. The method as recited in claim 2, wherein the correction signal is ascertained using a direction indicator signal representing an item of information about a lane change initiated and desired by the driver of the vehicle.

8. A control device for situation-related steering assistance in a lane keeping assistant for a vehicle, comprising:
   an interface configured to import a collision signal, during a lane change, representing an item of information about a risk of collision; and
   a processor configured to:
   ascertain a correction signal for an intervention steering torque of the lane keeping assistant using the collision signal, and
   adapt the intervention steering torque of the lane keeping assistant based on the correction signal, wherein (i) the intervention steering torque counteracts a steering torque applied by a driver of the vehicle and (ii) a steering torque threshold for deactivating the intervention steering torque varies as a function of the vehicle's surrounding conditions, wherein the intervention steering torque is deactivated if the steering torque applied by the driver exceeds the steering torque threshold.

9. The control device as recited in claim 8, wherein the interface for importing the collision signal is configured to at least one of receive and read in at least one of an analog and digital collision signal provided by at least one of a mono front camera, a stereo front camera, an ultrasound sensor, a radar sensor, a forward-looking sensor, and a distance sensor.

10. A non-transitory, computer-readable data storage medium storing a computer program having program codes which, when executed on a computer, perform a method for situation-related steering assistance in a lane keeping assistant for a vehicle, the method comprising:
   importing, with an interface, during a lane change, a collision signal representing an item of information about a risk of collision;
   ascertaining, with a processor, a correction signal for an intervention steering torque of the lane keeping assistant using the collision signal; and
   adapting, with the processor, the intervention steering torque of the lane keeping assistant based on the correction signal, wherein (i) the intervention steering torque counteracts a steering torque applied by a driver of the vehicle and (ii) a steering torque threshold for deactivating the intervention steering torque varies as a function of the vehicle's surrounding conditions, wherein the intervention steering torque is deactivated if the steering torque applied by the driver exceeds the steering torque threshold.

* * * * *